(No Model.) 2 Sheets—Sheet 1.

R. B. PUMPHREY.
MEAT CUTTER.

No. 413,459. Patented Oct. 22, 1889.

WITNESSES:
R. L. Clemmitt.
John E. Morris

INVENTOR:
R. B. Pumphrey
BY Chas. B. Mann
ATTORNEY.

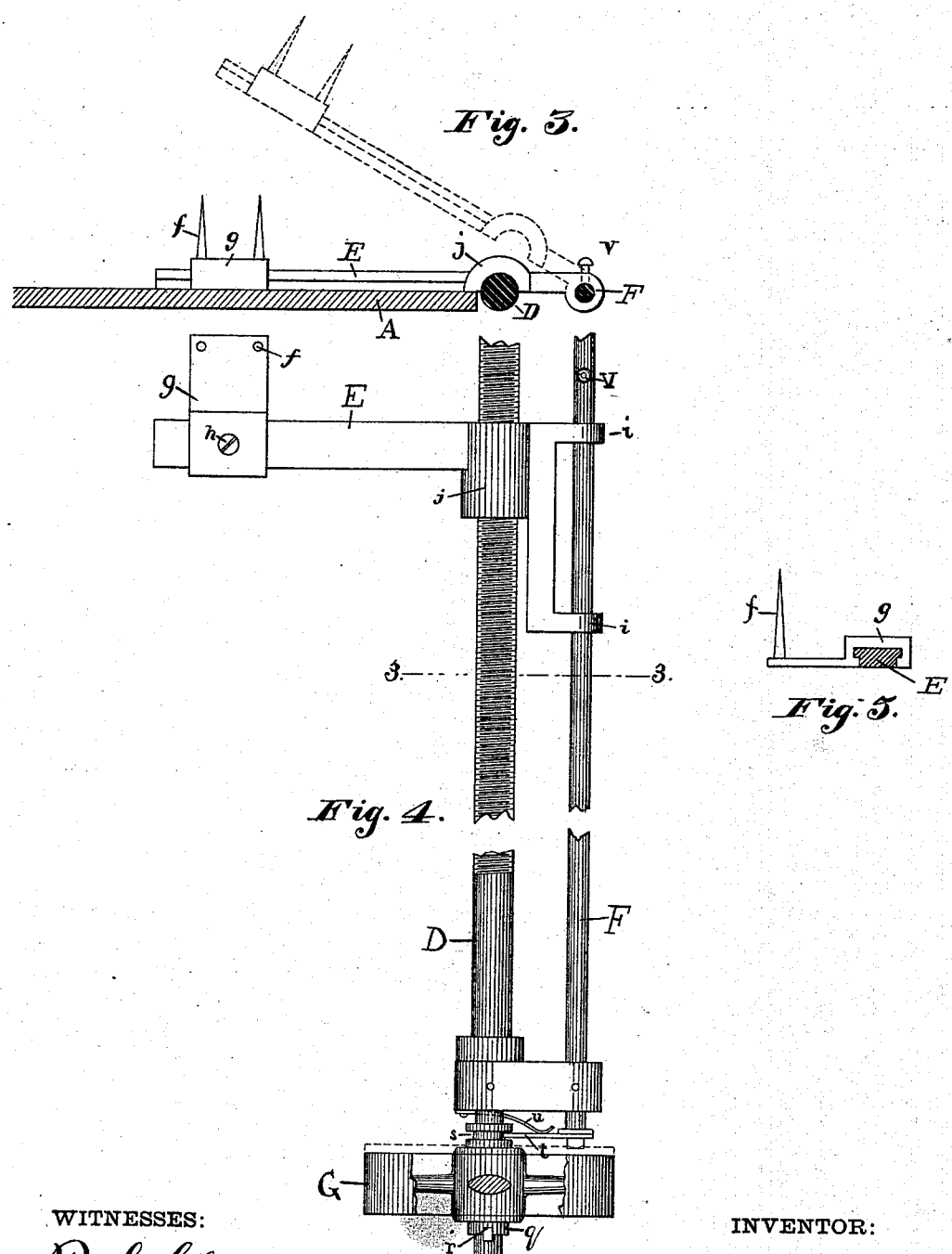

UNITED STATES PATENT OFFICE.

ROBERT B. PUMPHREY, OF BALTIMORE, MARYLAND.

MEAT-CUTTER.

SPECIFICATION forming part of Letters Patent No. 413,459, dated October 22, 1889.

Application filed December 15, 1888. Serial No. 293,729. (No model.)

*To all whom it may concern:*

Be it known that I, ROBERT B. PUMPHREY, a citizen of the United States, residing at Baltimore, in the State of Maryland, have invented certain new and useful Improvements in Meat-Cutters, of which the following is a specification.

This invention relates to improvements in machines for cutting meat, and has for its object to provide for cutting thin slices of meat.

The invention is illustrated in the accompanying drawings, in which—

Figure 1:
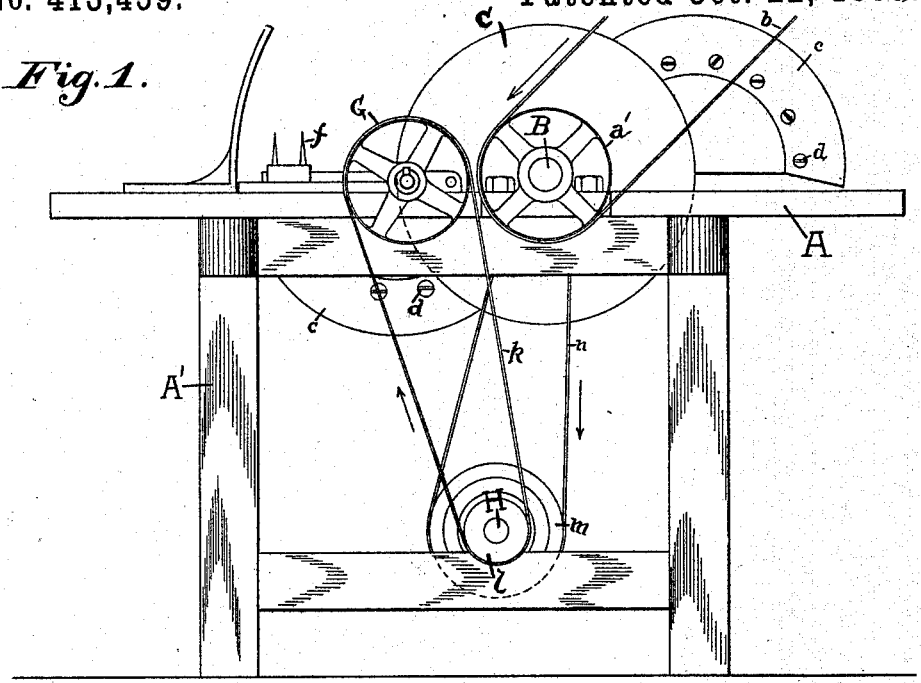
Figure 2:
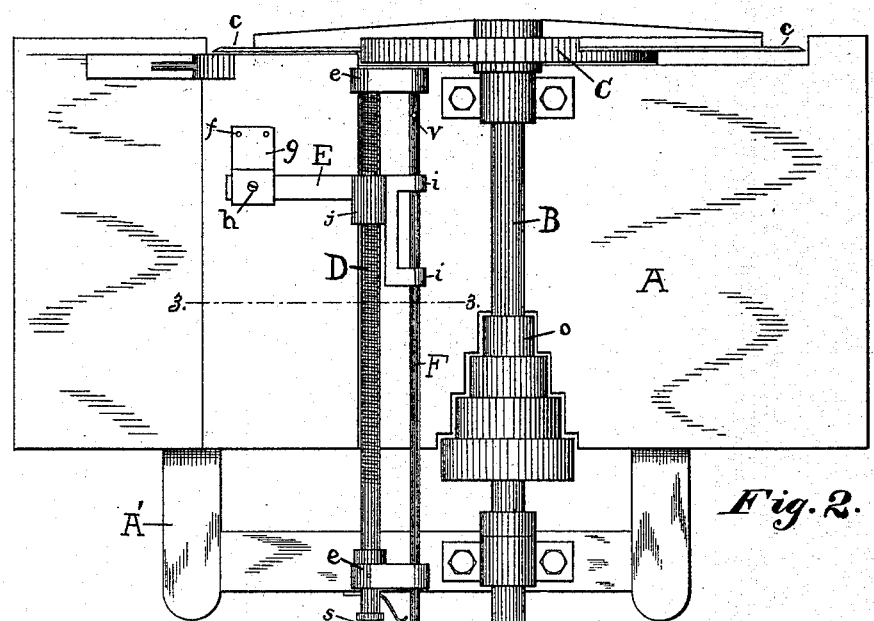

Figure 1 is an end elevation of the machine. Fig. 2 is a top view of the same. Fig. 3 is a cross-section on the line 3 3, Fig. 2, showing the meat-holder. Fig. 4 is a top view of the meat-holder, feed-screw, and automatic clutch-release for same. Fig. 5 is a side view of the prong-head and slide arm of the meat-holder.

The letter A designates the table-top; A', the frame supporting the said top; B, the main shaft extending across the table-top and provided with fast and loose pulleys $a$ $a'$, on which a drive-belt $b$ runs, and also provided with a cutter-head C, to which the knives or blades $c$ are attached by screws $d$. The cutters, it will thus be seen, revolve. Any preferred form of blades or cutter-head may be used with the features of invention hereinafter claimed.

The feed-screw D revolves in bearings $e$, but does not advance. One feature of invention is comprised in the combination of the means for driving the feed-screw and effecting its automatic stoppage when the meat-holder has advanced close enough to the cutters, as will be presently described.

The meat-holder comprises the prongs $f$, attached to a head $g$, which is fitted to slide on a pivoted arm E, and is fixed thereon or prevented from moving by a set-screw $h$, which admits of the prong-head $g$ being adjusted along the arm. The slide-arm E has at one end pivot-eyes $i$, which pivot loosely on a rod F, which has position parallel with the feed-screw D and is movable endwise in suitable bearings. As the eyes $i$ of the meat-holder are loose on the rod F, the said meat-holder may slide along the rod. This slide-arm E also has a concave screw-threaded part $j$, which serves as a half-nut, and fits upon the feed-screw D. In the normal position for feeding meat forward to the cutters $c$ the prong-head $g$ and slide-arm E will rest upon the table-top A, which position places the half-nut or screw-threaded part $j$ in contact with the feed-screw D. It will be seen the revolution of the feed-screw will cause the meat-holder to advance toward the cutters $c$. In order to return the meat-holder, or move it away from the cutters $c$, it is necessary to first elevate its free end, as indicated by broken lines in Fig. 3. This elevation removes the screw-threaded part $j$ from the feed-screw D, and while thus elevated the meat-holder $f$ $g$ E may be caused to slide along the rod F, as desired. By this arrangement the meat-holder is moved toward the cutter by the feed-screw D, and is moved away by lifting its free end and sliding it on the rod. The feed-screw D has on one end a pulley G, which is connected by a belt $k$ with a pulley $l$, on a counter-shaft H, which latter has a pulley $m$, and is driven by a belt $n$, connecting with a pulley $o$ on the main shaft B. The belt $n$ may be shifted to any one of the several faces of the pulley $o$, and thereby the speed of the feed-screw D may be increased or lessened and the meat slices made thinner or thicker.

To provide for automatically stopping the revolution of the feed-screw at the proper time without stopping the main shaft and cutter-head, the pulley G is loose on the end of the said screw-shaft and may be shifted along the shaft for a distance sufficient to engage with a pin $p$ on the shaft or be released from such engagement. In Figs. 2 and 4 of the drawings the said pulley G is shown engaged with the pin, and in the latter figure a broken line indicates the movement it makes when it is released from the said pin. The said pulley G has a hub $q$, provided on one side with a notch $r$, which engages, as stated, with the pin $p$, and on the other side the hub has an annular groove $s$. The endwise-movable rod F has a lateral arm $t$, which takes into the said annular groove $s$ on the pulley-hub. It will be seen that any longitudinal movement of the rod F will shift the pulley G and release it from engagement with the pin $p$, whereupon the feed-screw D will not revolve and the meat-holder will be stationary. This device is a clutch.

A spring $u$ is employed to press the rod F and pulley G and keep the pulley-notch $r$ engaged with the pin $p$. The spring $u$ will yield to allow said parts to be moved the opposite way. The rod F has a stop-shoulder $v$, located at a point where it will be pressed by one of the pivot-eyes $i$ of the meat-holder, when the latter has advanced close enough to the cutters. As the meat-holder advances by the action of the revolving feed-screw D, the pivot-eye $i$ will at last come against the said stop-shoulder $v$ on the rod and will move the rod endwise, thereby moving also the pulley G and release it from the pin $p$. The moment the meat-holder is moved away from the stop-shoulder the spring $u$ will press the parts and bring the pulley again in engagement with the pin $p$.

From the foregoing the operation of the machine will be understood.

Having described my invention, I claim—

1. In a meat-cutting machine, the combination of the cutters, the table-top A, the feed-screw D, extending across the table-top, a rod F, parallel with the feed-screw, a slide-arm E, having at one end pivot-eyes which fit loosely and slide on the said rod, and having at the other end a head device to hold the meat, and provided intermediate of its ends with a half-nut or threaded part $j$, which fits on the feed-screw, for the purpose set forth.

2. In a meat-cutting machine, the combination of the cutters, the feed-screw D, a pulley G, loose on the feed-screw shaft and movable longitudinally, a clutch device to engage the pulley and feed-screw shaft, a rod F, parallel with the feed-screw, movable endwise and connected with the said pulley G and having a stop-shoulder $v$, a slide-arm E, pivoted loosely and so as to slide on the said rod and provided with a half-nut or threaded part $j$, which fits on the feed-screw, and a head device to hold the meat, for the purpose set forth.

In testimony whereof I affix my signature in the presence of two witnesses.

ROBERT B. PUMPHREY.

Witnesses:
JOHN E. MORRIS,
JNO. T. MADDOX.